US007347141B2

(12) United States Patent
Boyce

(10) Patent No.: US 7,347,141 B2
(45) Date of Patent: Mar. 25, 2008

(54) SINGLE DRUM ROTARY PRINTING MACHINE

(75) Inventor: Keith W. Boyce, Churchville, PA (US)

(73) Assignee: R.W. Hartnett Company, Philadelphia, PA (US)

(*) Notice: Subject to any disclaimer, the term of this patent is extended or adjusted under 35 U.S.C. 154(b) by 0 days.

(21) Appl. No.: 11/423,028

(22) Filed: Jun. 8, 2006

(65) Prior Publication Data

US 2006/0278104 A1 Dec. 14, 2006

Related U.S. Application Data

(60) Provisional application No. 60/690,015, filed on Jun. 13, 2005.

(51) Int. Cl.
*B41F 17/00* (2006.01)
*A22C 17/10* (2006.01)

(52) U.S. Cl. ............................ 101/35; 101/37; 101/40; 426/383

(58) Field of Classification Search .................. 101/35, 101/37, 38.1, 40, 483, 484; 221/211, 157; 426/383; 197/397
See application file for complete search history.

(56) References Cited

U.S. PATENT DOCUMENTS

| | | | | |
|---|---|---|---|---|
| 2,859,689 A | | 11/1958 | Ackley | 101/35 |
| 3,601,041 A | | 8/1971 | Perra et al. | 101/37 |
| 3,802,340 A | * | 4/1974 | Braun | 101/37 |
| 3,843,018 A | | 10/1974 | Holmes et al. | 221/211 |
| 3,871,295 A | | 3/1975 | Ackley | 101/426 |
| 3,889,591 A | | 6/1975 | Noguchi | 101/37 |
| 4,167,226 A | * | 9/1979 | Ackley et al. | 198/397.04 |
| 4,193,343 A | | 3/1980 | Ackley, Sr. et al. | 101/35 |
| 4,208,962 A | | 6/1980 | Ackley, Sr. et al. | 101/35 |
| 4,266,477 A | | 5/1981 | Ackley | 101/40 |
| 4,266,478 A | | 5/1981 | Ackley | 101/40 |
| 4,308,942 A | | 1/1982 | Ackley | 198/380 |
| 4,327,825 A | | 5/1982 | Ackley, Sr. et al. | 198/380 |
| 4,369,702 A | | 1/1983 | Ackley | 101/40 |
| 4,372,437 A | | 2/1983 | Ackley | 198/380 |
| 4,377,971 A | | 3/1983 | Ackley | 101/40 |
| 4,472,960 A | | 9/1984 | Motoyama | 73/7 |

(Continued)

FOREIGN PATENT DOCUMENTS

| | | |
|---|---|---|
| DE | 3717593 | 5/1989 |

*Primary Examiner*—Daniel J. Colilla
*Assistant Examiner*—Marissa Ferguson-Samreth
(74) *Attorney, Agent, or Firm*—Synnestvedt & Lechner LLP

(57) ABSTRACT

A rotary machine including a substantially vertical rotatable drum having pellet-receiving receptacles in its peripheral sidewall. Gravity causes pellets to collect toward the drum's bottom. As the drum rotates, pellets received in the receptacles are carried upwardly from the bottom. A printing device positioned within the peripheral sidewall prints indicia on the inwardly exposed surfaces of the pellets. Optionally, the receptacles define apertures extending through the peripheral sidewall, and a printing device is positioned externally to the peripheral sidewall to print indicia on the outwardly exposed surfaces of the pellets. Drilling or inspection devices may be provided in addition to, or instead of, the printing devices. A support member may be provided adjacent the peripheral sidewall to prevent gravity from causing the pellets to exit the receptacles. Chutes may be provided to supply and remove pellets to and from the drum. An air stream may eject pellets from their receptacles.

22 Claims, 7 Drawing Sheets

U.S. PATENT DOCUMENTS

| | | | | |
|---|---|---|---|---|
| 4,619,196 | A | 10/1986 | Matsuoka | 101/35 |
| 4,632,028 | A | 12/1986 | Ackley | 101/40 |
| 4,672,892 | A | 6/1987 | Ackley | 101/35 |
| 4,905,589 | A | 3/1990 | Ackley | 101/35 |
| 5,423,252 | A | 6/1995 | Yamamoto et al. | 101/35 |
| 5,433,146 | A | 7/1995 | Ackley | 101/35 |
| 5,768,996 | A | 6/1998 | Ackley | 101/483 |
| 5,836,243 | A | 11/1998 | Ackley | 10/44 |
| 5,878,658 | A | 3/1999 | Ackley | 101/35 |
| 5,979,309 | A | 11/1999 | Boyce | 101/35 |
| 5,996,768 | A | 12/1999 | Boyce et al. | 198/397.01 |
| 6,286,421 | B1 | 9/2001 | Ackley | 101/38.1 |
| 6,450,089 | B2 | 9/2002 | Ackley | 101/38 |
| 6,481,347 | B2 | 11/2002 | Ackley | |
| 6,741,731 | B1 | 5/2004 | Yamamoto et al. | 382/141 |
| 6,823,795 | B2 | 11/2004 | Willcocks et al. | 101/492 |
| 2001/0039889 | A1 | 11/2001 | Ackley | 101/38.1 |
| 2001/0042455 | A1 | 11/2001 | Ackley | 101/35 |
| 2003/0035870 | A1 | 2/2003 | Ackley, Jr. et al. | 426/383 |
| 2003/0177919 | A1 | 9/2003 | Volder | 101/41 |
| 2004/0013778 | A1 | 1/2004 | Ackley, Jr. et al. | 426/383 |
| 2004/0091594 | A1 | 5/2004 | Ackley, Jr. et al. | 426/383 |
| 2004/0094050 | A1 | 5/2004 | Ackley, Jr. et al. | 101/44 |
| 2004/0099159 | A1 | 5/2004 | Volder | 101/35 |
| 2006/0006190 | A1 * | 1/2006 | Janet et al. | 221/211 |

* cited by examiner

SINGLE DRUM ROTARY PRINTING MACHINE

CROSS-REFERENCE TO RELATED APPLICATION

The present application claims the benefit of U.S. Provisional Patent Application No. 60/690,015, filed Jun. 13, 2005, the entire disclosure of which is hereby incorporated herein by reference.

FIELD OF THE INVENTION

The present invention relates to printing machines for imprinting indicia on tablets, pills, candies, or other uniformly shaped products.

DISCUSSION OF THE RELATED ART

In the manufacture of many pharmaceutical products such as pills or lozenges, candies such as "M&M's" and small mechanical parts, it is often desirable to imprint a trademark, indicia or other information or intelligence on each item. These products share a common characteristic in that they are all pellet-like, being small, often round or rounded, oval, bulbous, cylindrical or polygonal in shape. Examples of pellet-like items ("pellets") are pills, lozenges, capsules, tablets, caplets and certain candies.

Imprinting indicia on a series of pellets is often accomplished by a machine that receives a large number of pellets in bulk, typically from a feed hopper or bin, orients the pellets, conveys the oriented pellets to a printing unit wherein the indicia are applied to each pellet, and discharges the pellets for subsequent packaging.

U.S. Pat. No. 2,859,689 to Ackley, the entire disclosure of which is hereby incorporated herein by reference, is a typical example of a pellet-marking machine which performs the steps outlined above. Pellets, seen in FIG. 2 of the '689 patent, designated "P", are loaded in bulk into the feed hopper 22 where they are received by a rotating drum or cylinder roll 23. The drum has a multiplicity of concavities or recesses 33 in its outwardly facing surface formed in accordance with the shape and size of the pellets being processed. The pellets P are received into the concavities 33 as the drum rotates clockwise beneath hopper 22, retained in the concavities by cylindrical retainer surface 50 as the drum rotates and released to an endless conveyor 24 located beneath the drum, the conveyor having a multiplicity of individual carrier bars 110. Carrier bars 110 have corresponding concavities matching the concavities 33 in drum 23, and conveyor 24 is synchronized with drum 23 so that the matching concavities on the drum and the conveyor line up as the drum rotates clockwise and the conveyor circulates counterclockwise. Pellets P drop from concavities 33 in drum 23 into the matching concavities in the endless conveyor 24 once the items are clear of retaining surface 50. The pellets P are then conveyed to a printing roller 27 which has ink laden images of the indicia or intelligence to be imprinted on the pellets peripherally arrayed on its peripheral surface. Printing roller 27 rotates clockwise in synchronization with endless conveyor 24 and contacts the pellets P as they pass beneath the printing roller 27, applying the ink laden image to each pellet. After passing beneath printing roller 27 the pellets P are discharged from conveyor 24 as the conveyor rounds its drive sprocket and the carrier bars 110 are momentarily vertically oriented.

U.S. Pat. No. 4,377,971 to Ackley, the entire disclosure of which is hereby incorporated herein by reference, discloses another exemplary pellet-printing machine including a two-drum rectifying and rotary printing system for printing indicia on pellets 3, as shown in FIG. 1. Pellets 3 are loaded in bulk into a feed hopper 1. A first drum 5 rotates adjacent to the hopper and picks up the pellets in concavities 9 positioned on the drum's outer surface. As the drum rotates, the pellets are captured within the concavities by a curved surface 23 located adjacent to drum 5. The pellets are transferred to a second drum 46 positioned beneath drum 5, the second drum 46 also having concavities 44 on its outer surface. Second drum 46 rotates synchronously with drum 5, the concavities on each drum aligning with one another to effect transfer of the pellets. Continued rotation of drum 46 moves the pellets past a printing station which comprises a rubber print roller 69 and an image roller 71. Indicia are transferred from the rubber print roller 69 to the pellets as they contact the rubber roller while traversing the printing station. During printing, the pellets are held within concavities 44 on the outer surface of the second drum by a wire guide 73 that is positioned between the printing station and the outer surface of the drum 48. The pellets are discharged into a chute 82 after they have completed traversal of the length of the wire guide 73.

U.S. Pat. No. 3,889,591 to Noguchi, the entire disclosure of which is hereby incorporated herein by reference, discloses yet another exemplary pellet printing machine including a two-drum printing system for printing indicia on pellets T, as shown in FIG. 1. Pellets T are loaded in bulk into a feed hopper 23. A first drum 17 rotates adjacent to the hopper and picks up the pellets in receptacles 17*a* positioned on the drum's outer surface. As the drum rotates, the pellets T are held within the receptacles 17*a* by vacuum as they travel past a first printing station 30, which includes a rotogravure cylinder positioned for printing on the exposed first surfaces of the pellets T. The pellets are then transferred to a second drum 18 positioned beneath the first drum 17, the second drum 18 also having receptacles 18*a* on its outer surface. Second drum 18 rotates synchronously with first drum 17, the receptacles on each drum aligning with one another to effect transfer of the pellets, with the assistance of vacuum and air sources. During this transfer to the second drum 18, the pellets T are re-oriented to expose their respective opposite second surfaces. Continued rotation of second drum 18 moves the pellets T past a second printing station 30' which includes another rotogravure cylinder positioned for printing on the exposed second surfaces of the pellets T. The pellets are discharged into a chute 36 after they have completed traversal of the second printing station 30'.

The use of multiple drums for transporting the pellets, and the resulting need for synchronization of the drums, adds to the complexity and associated manufacturing and maintenance costs of such machines.

SUMMARY OF THE INVENTION

The present invention provides a single-drum machine for marking, drilling, and/or inspecting pellet-like objects, such as pharmaceutical tablets and capsules, as well as confections such as M&Ms, e.g. to print brand names, logos or other indicia on such objects.

The machine includes a support structure, a drum rotatably carried on the support structure, a drive system operable to rotate the drum, and a printing device for printing desired indicia on the pellets. The drum has a peripheral sidewall defining an inner portion of the drum. The drum's sidewall has an inner surface that defines a plurality of receptacles. Each of the receptacles is dimensioned to receive a pellet. The receptacles may be configured to define an aperture that is open through the sidewall to allow for printing on the outwardly facing sides of the pellets, e.g., when two-sided printing is desired. The printing device is fixed relative to the support structure, and may be positioned internally to the drum for printing on inwardly facing surfaces of the pellets, or externally to the drum for printing on outwardly facing surfaces of the pellets. Optionally, the printing machine includes multiple printing (or drilling or inspecting) devices, one of which is positioned internally to the drum, another of which is positioned externally to the drum, so that the pellets may be imprinted (or drilled or inspected) on both their inwardly and outwardly facing surfaces.

Gravity causes pellets fed to an interior portion of the drum to collect toward its bottom. As the drum rotates, pellets received in the receptacles are carried upwardly from the bottom. In one embodiment, a first printing device positioned within the peripheral sidewall prints indicia on the inwardly exposed surfaces of the pellets, and a second printing device positioned externally to the peripheral sidewall prints indicia on the outwardly exposed surfaces of the pellets. A support member may be provided internally to the peripheral sidewall to prevent gravity from causing the pellets to exit the receptacles as the drum rotates. Chutes may be provided to supply pellets to an internal portion the drum, and to remove printed pellets from the drum. An air stream may be used to eject printed pellets from their receptacles and direct them to a discharge chute.

Accordingly, the printing machine described above allows for two-sided printing of pellets while requiring only a single drum for transporting the pellets. The need for multiple drums and synchronization of drums is thus eliminated. Additionally, the single-drum machine eliminates the need to re-orient the pellets relative to the drum between printing operations for printing on the first and second opposite surfaces of the pellets. Further, the printing machine described above uses the drum itself as a pellet hopper for feeding pellets, feeds pellets to receptacles in the drum from the interior portion of the drum, and is configured to carry pellets, and print upon pellets, while they are carried on an inner surface of the drum.

BRIEF DESCRIPTION OF THE DRAWINGS

The present invention will now be described by way of example with reference to the following drawings in which.

DETAILED DESCRIPTION

The present invention provides a machine for transporting and marking pellet-like objects, such as pharmaceutical tablets and capsules, as well as confections such as M&Ms, with brand names, logos or other indicia. The machine allows for printing (or drilling or inspecting) on opposite surfaces (e.g., opposite sides) of pellets while requiring only a single drum for transporting the pellets, thus eliminating the need for synchronization of multiple drums. Further, the single-drum machine eliminates the need to re-orient the pellets relative to the drum between printing operations for printing on the first and second sides of the pellets.

Figure 1:
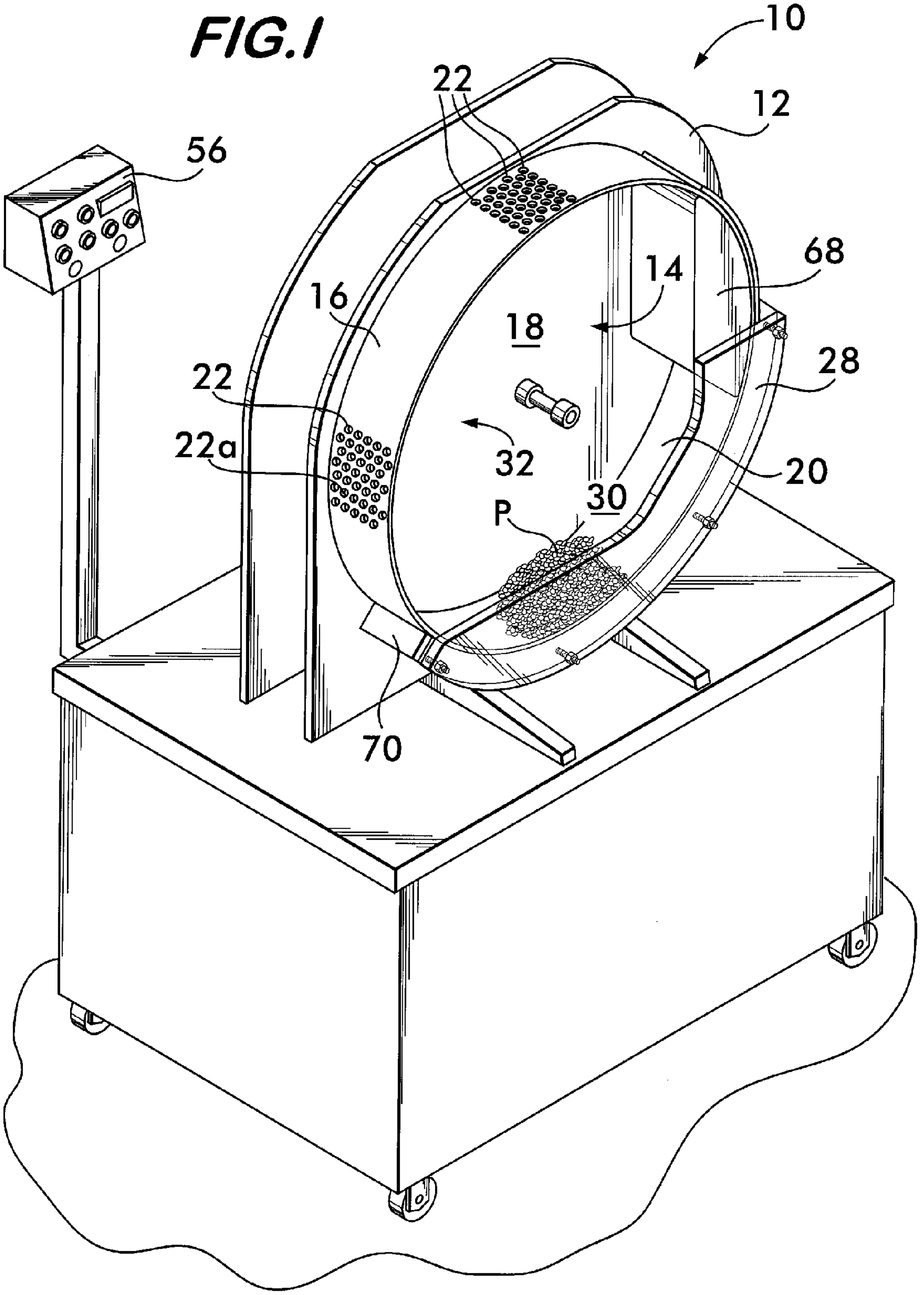
FIG. 1 is a perspective view of a printing machine in accordance with an exemplary embodiment of the present invention.
Figure 2:
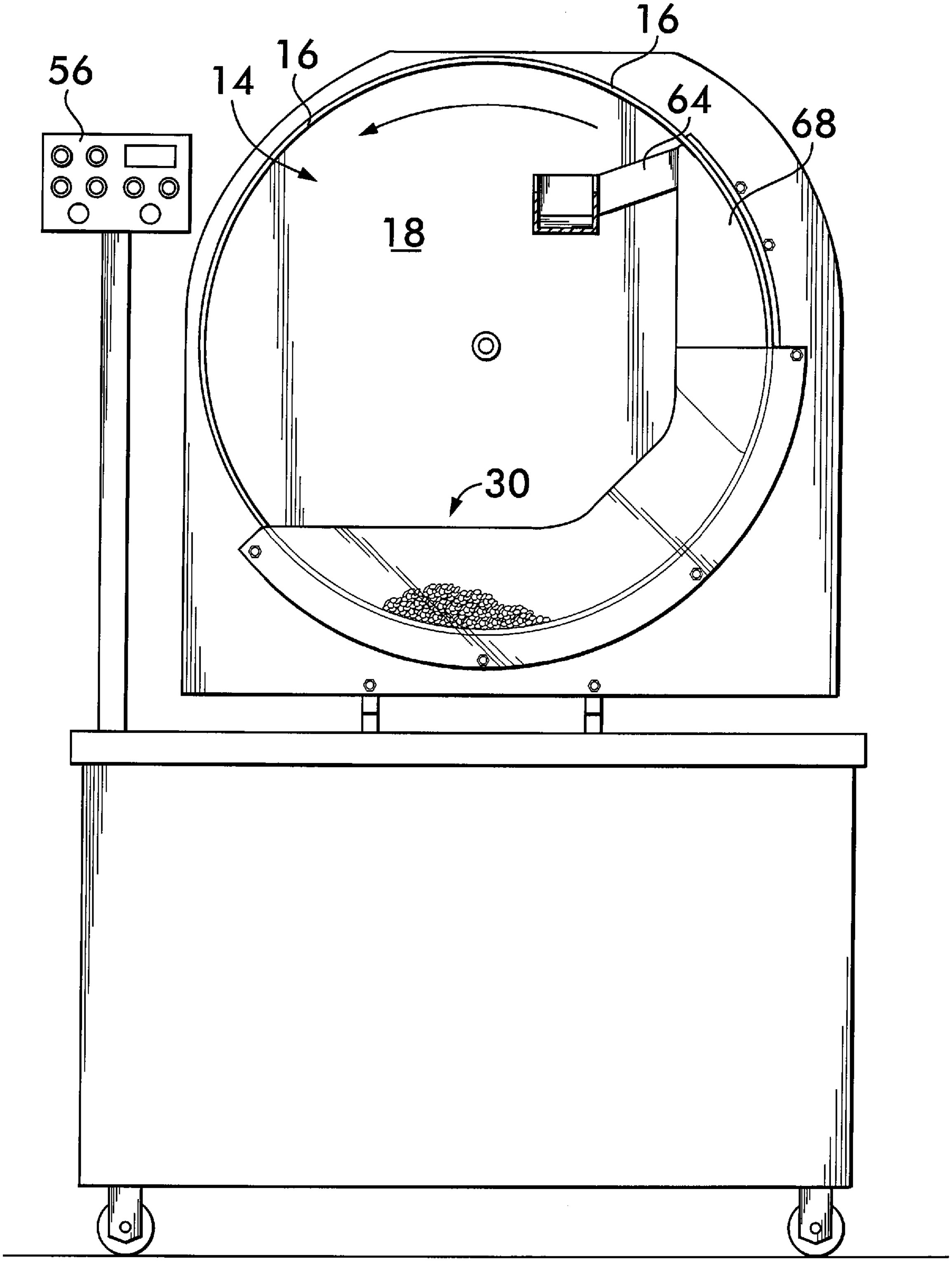
FIG. 2 is a front view of the printing machine of FIG. 1.
Figure 3:
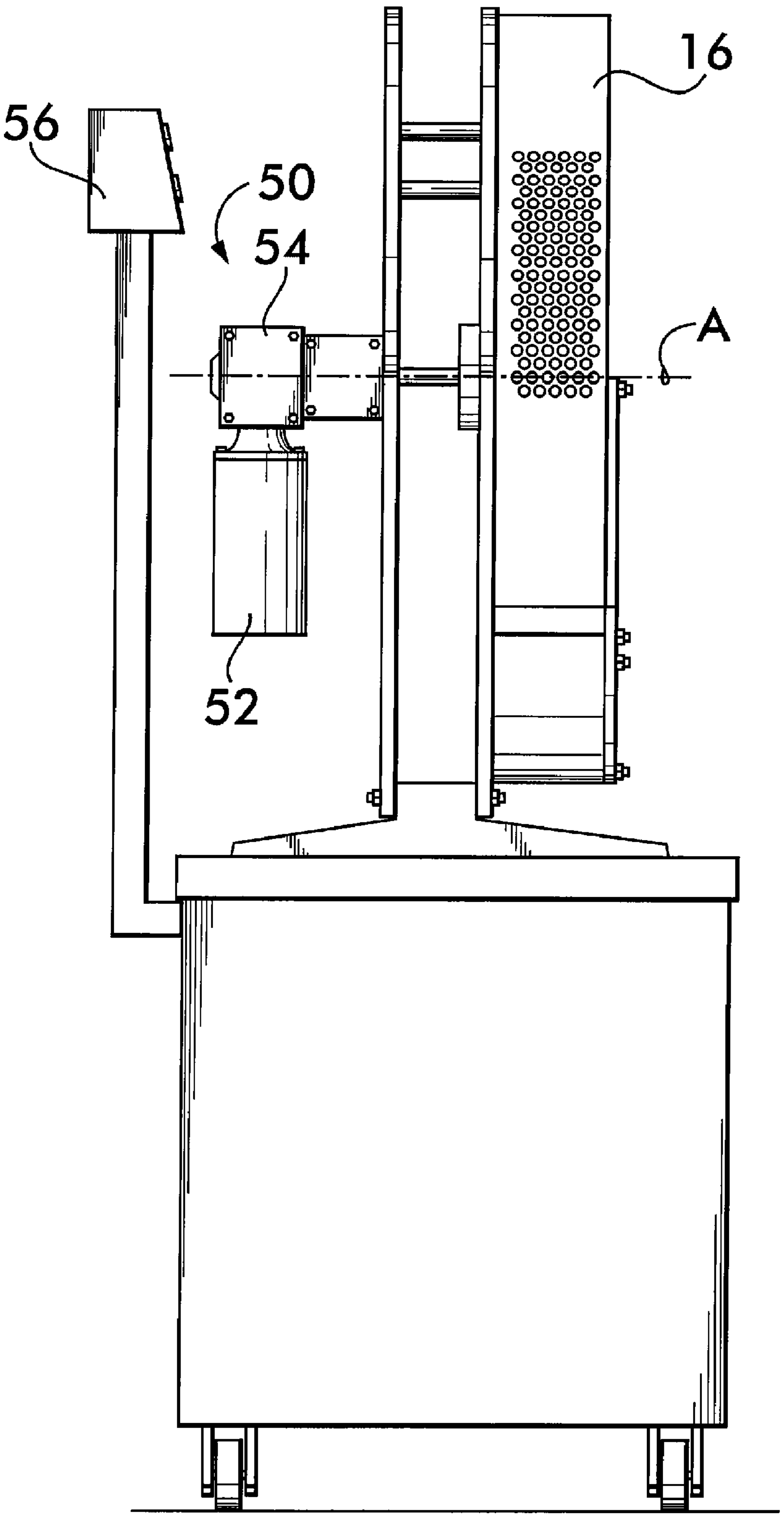
FIG. 3 is side view of the printing machine of FIG. 1.

FIGS. 1-6 show an exemplary printing machine for printing indicia on a plurality of pellets of similar shape and size, such as M&M® brand candies. Referring now to FIGS. 1-3, the machine 10 includes a support structure 12 on which a drum 14 is carried. The drum 14 is mounted on the support structure 12 so as to be rotatable about an axis A that is substantially horizontal, as best shown in FIG. 3. Accordingly, the machine 10 includes a drive system 50 operable to rotate the drum 14 relative to the support structure 12, i.e. about the axis A. By way of partial example, such a drive system 50 may include an electrically powered motor 52, a gear train 54, and a control panel 56, as shown in FIGS. 1-3. Suitable conventional drive systems are well known in the art and are outside of the scope of the present invention, and thus are not discussed in further detail herein. A rotation speed of 7 RPM has been found suitable for printing.

Figure 4:
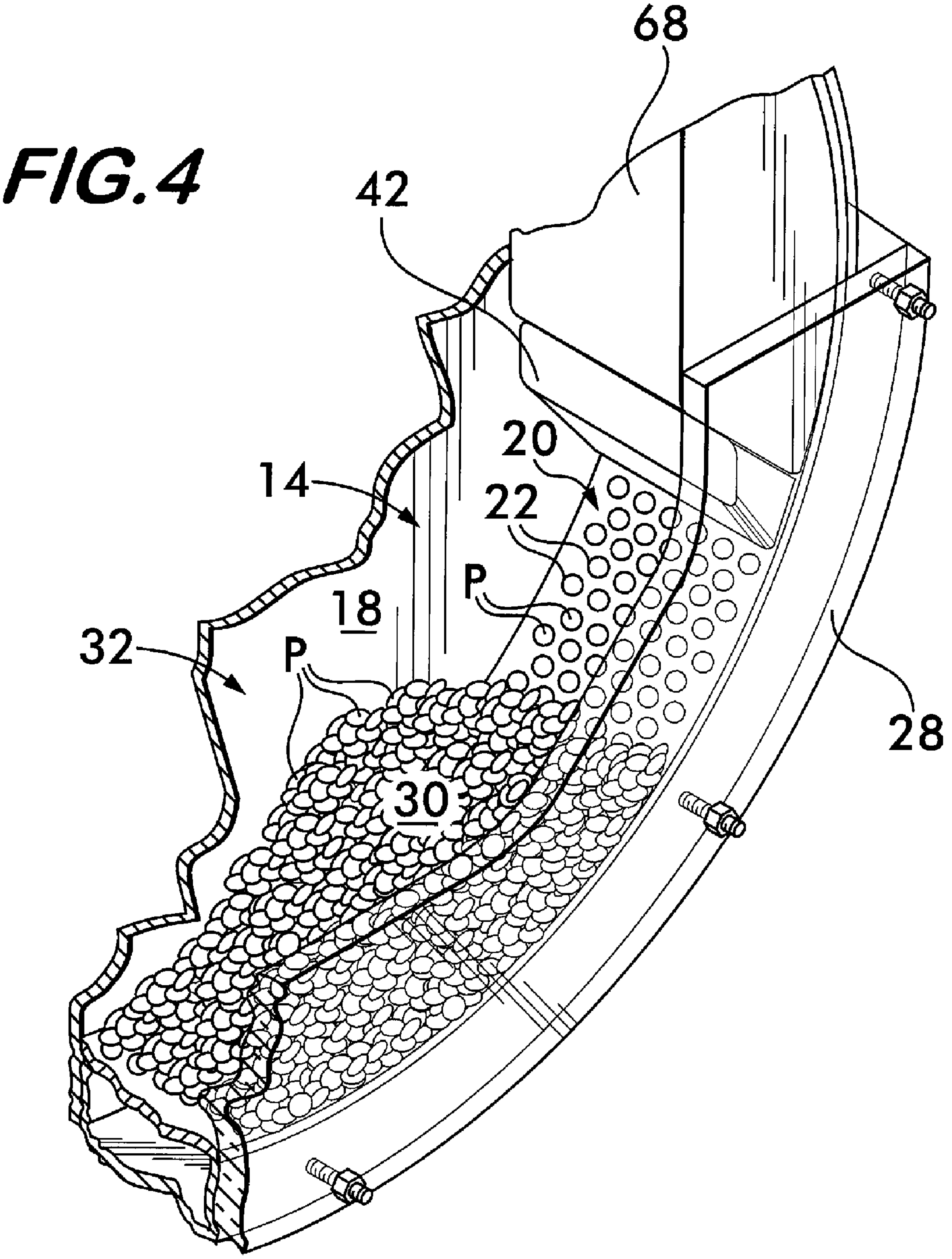
FIG. 4 is an enlarged partial perspective view of the hopper of the printing machine of FIG. 1.

The drum 14 has a peripheral sidewall 16 defining an inner portion 18 of the drum 14. The sidewall 16 is preferably circular, i.e. circumferential, and has an inner surface 20, which is proximate to the axis A. By way of example, the sidewall 16 may be between 24 and 48 inches in diameter. The inner surface 20 defines a plurality of receptacles 22, as best shown in FIGS. 1 and 4. In one embodiment, the receptacles 22 are arranged in axial and circumferential rows. In a preferred embodiment, the receptacles 22 are arranged in axial rows that are not circumferential, but rather are nested, as shown in FIGS. 1-6 and best shown in FIG. 4. Such a nested configuration may be useful to increase throughput by increasing the number of pellets carried per unit of circumference of the sidewall. Each of the receptacles 22 is dimensioned to receive a respective one of the pellets P, but to prevent passage of a pellet through the sidewall 16, as best shown in FIGS. 4 and 6.

In one embodiment, each receptacle 22 is merely a concavity formed in the inner surface 20 of the peripheral sidewall 16 that is open to the inner portion 18 of the drum 14, as best shown in FIG. 4. Accordingly, the receptacle is open on only one side of the peripheral sidewall 16, namely along the inner surface 20 [not shown]. Such an embodiment is sufficient, for example, when it is desired to print on (or drill, or inspect) only one side of each pellet, namely, the inwardly facing side of each pellet, such printing being discussed in greater detail below.

In an alternative embodiment, as shown in FIGS. 1-6, each receptacle 22 defines an aperture 22*a* that is open through the peripheral sidewall 16, as best shown in FIGS. 1 and 4. Accordingly, the receptacle is open on both sides of the peripheral sidewall 16, namely along both the inner surface 20 and the outer surface 24 of the sidewall 16, as best shown in FIGS. 1 and 6. Such an embodiment is desirable, for example, when it is desired to print on (or drill, or inspect) both of two opposite surface of each pellet, namely, both the inwardly facing surface and the outwardly facing surface of each pellet, such printing being discussed in greater detail below.

In the alternative embodiment discussed above, each receptacle 20 may be dimensioned and/or contoured so that at least a portion of each pellet projects through a respective aperture 22*a* and thus extends beyond the outer surface 24 of the peripheral sidewall 16. Such a configuration may be particularly desirable when physical contact with the pellet is required during the printing process, as when a rotogravure type printing device is used for printing.

Alternatively, each receptacle may be dimensioned and/or contoured so that no portion of each pellet projects through a respective aperture 22*a*, and thus no portion of each pellet extends beyond the outer surface 24 of the peripheral sidewall 16. Such a configuration may be suitable when physical contact with the pellet is not required during the printing process, as when a laser printer type printing device is used for printing.

In yet another embodiment, each receptacle is not a concavity but rather simply an opening through which the pellet may pass through the sidewall. In such an embodiment, additional structures adjacent the sidewall 16, such as member 68 or structure 70 discussed below, help retain each pellet in a receptacle.

In all of the receptacle configurations discussed above, portions of the pellets are accessible for printing via a respective aperture of each of said plurality of receptacles. Preferably, the sidewall is chamfered around each receptacle to facilitate seating of a pellet with the receptacle, and to reduce the possible of damage to pellets.

Figure 7:
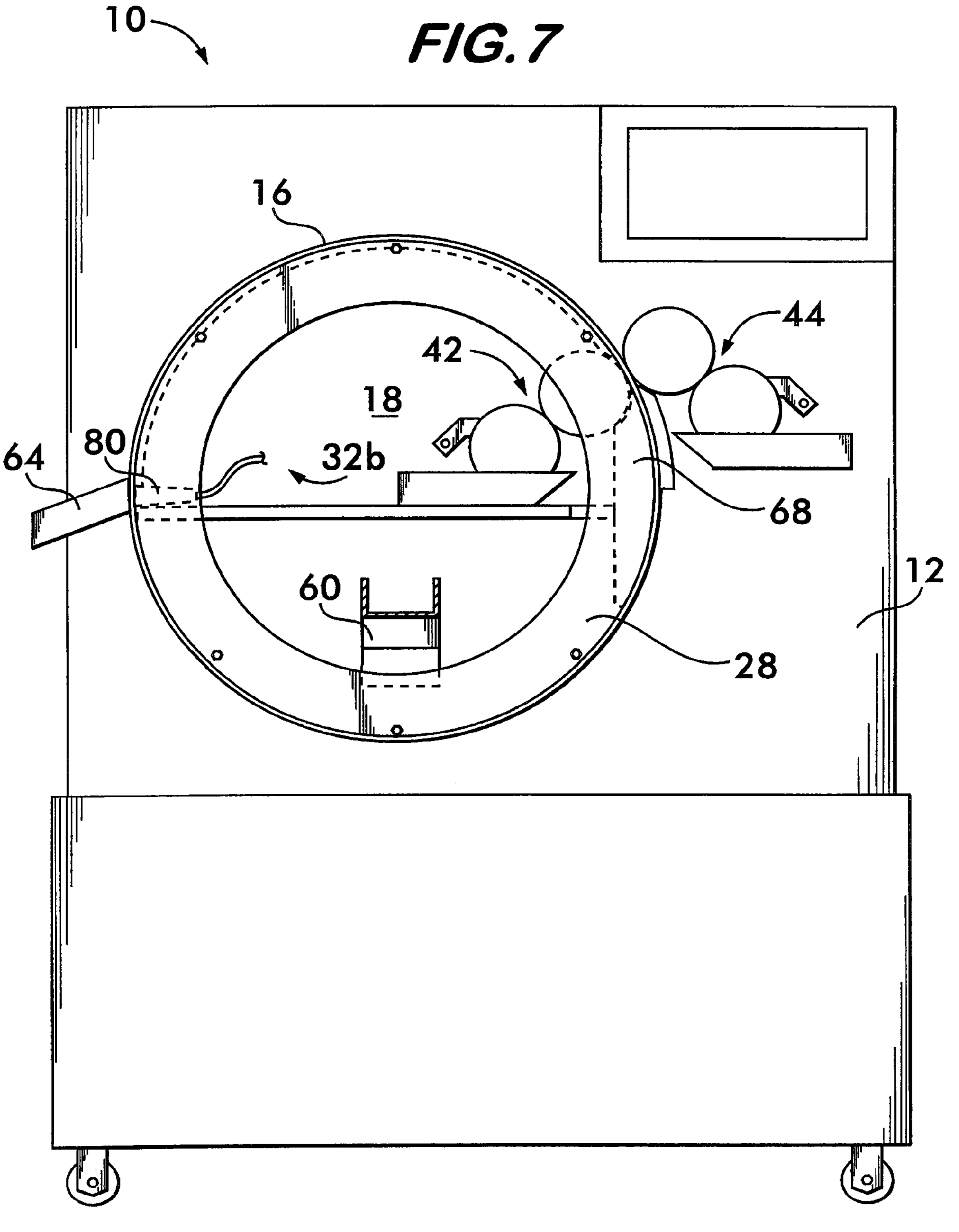
FIG. 7 is a front side view of an alternative embodiment of the printing machine of FIG. 1.

Optionally, the printing machine 10 includes a bracing wall 28 cooperating with the drum 14 to provide a pellet hopper 30. In one embodiment, the bracing wall is joined to the peripheral sidewall 16 of the drum 14, and extends radially inwardly of the drum, as shown in FIG. 7. Accordingly, a pellet hopper 30 is formed toward the bottom of the drum, the pellet hopper's walls being defined along the bottom by the sidewall 16, and along the sides by an end wall 32, which may be a rotating portion of the drum 14 or a stationary portion of the support structure, and the bracing wall 28.

In an alternative embodiment, the bracing wall 28 is fixed in position relative to the support structure 12 in adjacent relationship to the peripheral sidewall 16 of the drum, as best shown in FIGS. 1 and 4. Accordingly, the pellet hopper's 30 walls are defined along the bottom by the sidewall 16, and along the sides by the end wall 32 and the bracing wall 28, as best shown in FIGS. 1 and 4.

An exemplary embodiment of the printing machine 10 also includes first and second printing devices. Suitable conventional printing devices are well known in the art and thus are not discussed in detail herein. By way of example, a conventional rotogravure, ink jet or laser printer device may be used. Alternatively, laser drilling equipment and/or a camera and/or other inspection equipment may be used as part of, in conjunction with, or instead of the printing devices described above. Such devices may be positioned relative to the sidewall 16 in a manner similar to the printing devices discussed above. Accordingly, such devices are interchangeable in a manner relevant to the operation of the device. For illustrative purposes, the machine is described below with reference to a printing device.

One or more printing devices may be used, and the devices may provide for printing on one side, or on both opposite sides, of each pellet. Each printing device is preferably fixed relative to the support structure 12, e.g. on the support structure 12, in position to print indicia on each of the pellets while the pellets are positioned within the receptacles 22. Thus, printing on the pellets occurs as the drum 14 rotates relative to the support structure 12. The printed portion may be either the inwardly facing surfaces of the pellets or the outwardly facing surfaces of the pellets. The printing device may thus be mounted internally to, or externally to, the inner portion of the drum, as desired.

In a preferred embodiment, the printing machine 10 includes at least two printing (or drilling or inspecting) devices, one of which is positioned to print (or drill or inspect) indicia on a respective first portion of each of the pellets, and another which is positioned to printing indicia on a respective second portion of each of the pellets, each second portion being opposite a respective first portion. Exemplary printing devices are shown diagrammatically in block form at 42 and 44 in FIGS. 4 and 5. As discussed above, the block form 42 may additionally or alternatively represent a laser drilling device or a camera or other inspection devices, as will be appreciated by those skilled in the art. The printing devices are omitted from the remaining Figures for illustrative clarity.

The printing machine 10 may further include a first chute 60 fixed relative to, e.g. mounted on, the support structure 12 in a position to direct a supply of pellets to the inner portion 18 of the drum 14 and/or a second chute 64 fixed relative to, e.g. mounted on, the support structure 12 in a position to direct pellets imprinted with indicia away from the inner portion 18 of the drum 14, as best shown in FIG. 6.

In an embodiment in which a printing device is located externally to the inner portion (see printing device 44, FIG. 5) of the drum 14, or in which the second chute 64 is located high enough relative to the bottom of the drum 14 that gravity tends to cause the pellets to exit their respective receptacles (see FIG. 6), the printing machine 10 may also include a support member 58 fixed in position relative to, e.g. mounted on, the support structure 12, as shown in FIGS. 1, 2, 4 and 5. The support member 68 is positioned within the inner portion 18 of the peripheral sidewall 16/drum 14 in a position to prevent gravity from causing said pellets to exit respective ones of said plurality of receptacles, as best shown in FIG. 1.

Figure 5:
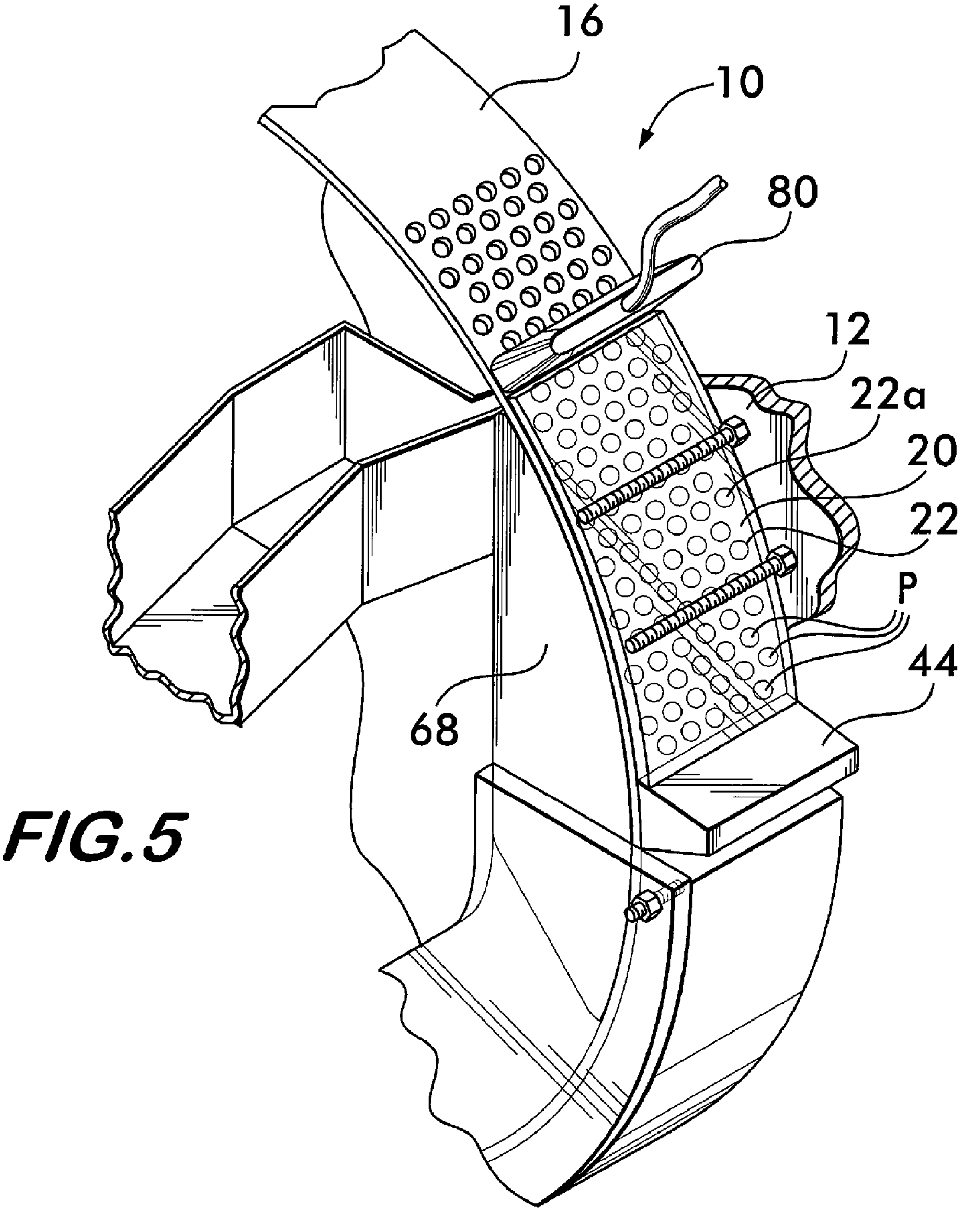
FIG. 5 is an enlarged partial perspective view of the outer surface of the drum of the printing machine of FIG. 1.
Figure 6:
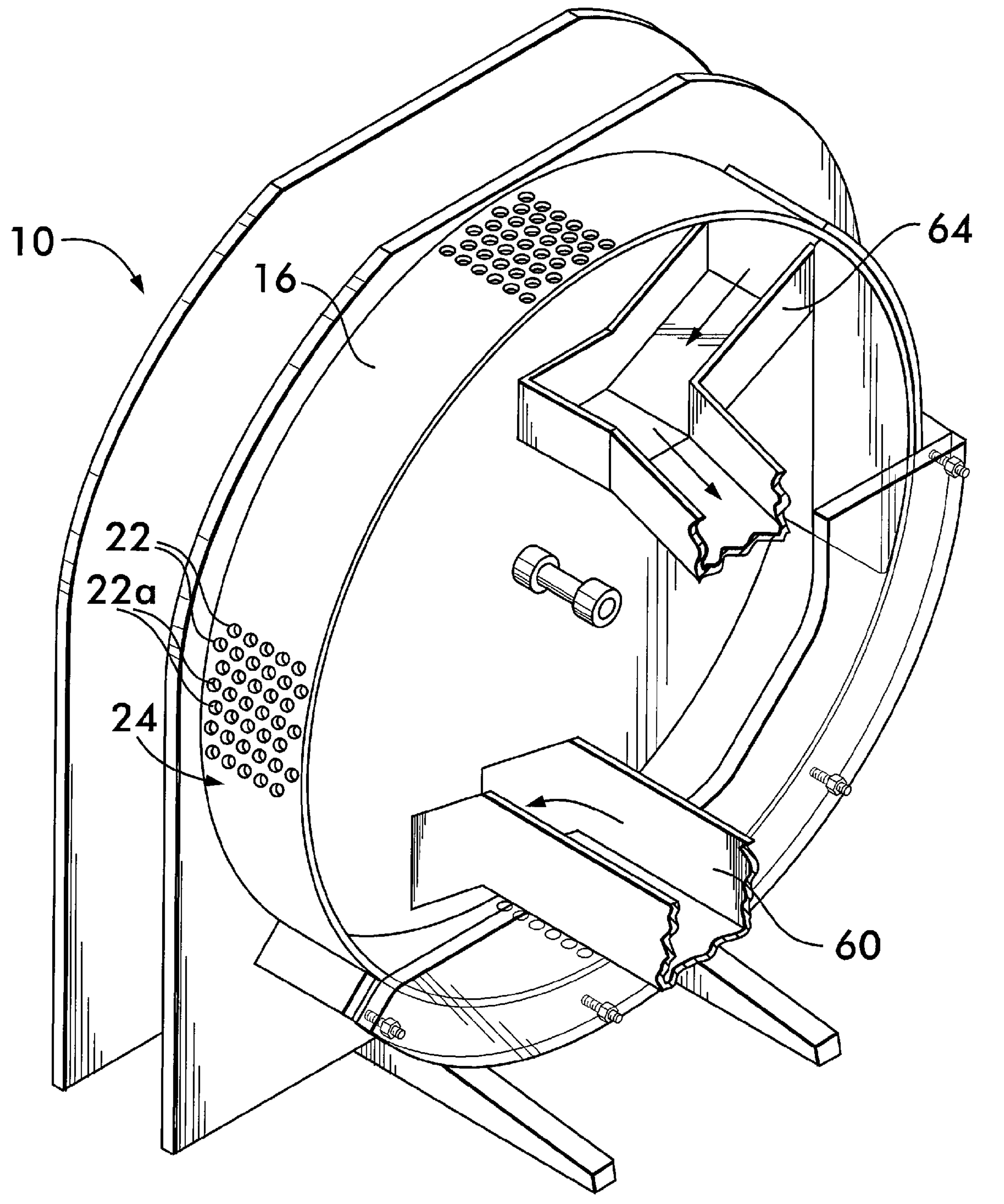
FIG. 6 is an enlarged partial perspective view of the supply and discharge chutes of the printing machine of FIG. 1.

Optionally, the printing machine 10 includes a nozzle 80 connected to an air source and supported externally to the internal portion of the peripheral sidewall 16 in a position to direct a flow of air toward the internal portion 18 of the peripheral sidewall 16, e.g. radially inwardly, as shown in FIG. 5. In this manner, the nozzle 80 directs air from the outer surface 24 toward the inner surface 20 of the peripheral sidewall 16 and is thus capable of dislodging a pellet P from a respective one of the plurality of receptacles 22 and direct it into the second chute 58. Alternatively, the receptacles may be configured to allow the pellets to pass through the sidewall 16, and the nozzle 80 may be positioned internally to the internal portion of the peripheral sidewall 16 in a position to direct a flow of air toward the outer portion of the peripheral sidewall 16, e.g. radially outwardly, as best shown in FIG. 7.

Optionally, the printing machine 10 further includes a vacuum chest 70 or other structure configured to draw a vacuum through the receptacles of the portion of the peripheral sidewall 16 that is presently positioned within the hopper 30, as best shown in FIG. 1. This facilitates the seating of individual pellets 22 within the receptacles 20 of the peripheral sidewall 16, and may be particularly useful to expedite such seating when the drum 14 is rotating at a relatively high rate of rotation.

In use, the exemplary printing machine of FIGS. 1-6 is operable to print on both sides of pellets P. Pellets are fed in bulk via supply chute 60 to the inner portion 18 of the drum 14 of the printing machine 10. Gravity causes the pellets P to tend to collect toward the bottom of the drum 14, namely in hopper 30 formed toward the bottom of the drum 14 by the end wall of the drum 14, the peripheral sidewall 16 of the drum 14 and the bracing wall 28, as best shown in FIG. 4.

As the peripheral sidewall 16 rotates through the hopper 30, in the counterclockwise direction shown in FIG. 2, pellets P are received within the receptacles 20, as best shown in FIG. 4. This may be facilitated by a vacuum flow being drawing through the receptacles 22. As the drum 14 continues to rotate, individual pellets P seated within the receptacles 22 travel up and away from the hopper 30, as best shown in FIGS. 4 and 5.

In the exemplary embodiment of FIGS. 1-6, a first printing 42 device is positioned interior to the inner portion 18 of the drum 16, as shown in FIG. 4. Accordingly, the pellets P positioned within the receptacles 22 travel past the first printing device 42 and are printed on their respective first portions, namely, their inwardly facing sides, with appropriate indicia.

As the drum 14 continues to rotate, the pellets P become trapped within the receptacles 22 as they travel adjacent the support member 68 positioned within the inner portion of the drum 14, as shown in FIGS. 4 and 5. The support member 68 is positioned in close proximity to the inner surface 20 of the peripheral sidewall 16 and thus prevents the pellets P from exiting the individual receptacles under gravitational pull, as best shown in FIGS. 2, 4 and 5.

A second printing device 44 is positioned externally to the inner portion 18 of the drum 14. Accordingly, the pellets P positioned within the receptacles next travel past the second printing device 44 and are printed on their respective second portions, namely, their outwardly facing sides, with appropriate indicia, as best shown in FIGS. 2, 4 and 5. It is noted that the printing on these outwardly facing sides occurs by printing through the apertures 20*a* of the receptacles, or by printing on a portion of the pellets P that projects through such apertures 20*a*.

Accordingly, because the printing devices 42, 44 are positioned on opposite sides of the peripheral sidewall 16 of the drum 14, they can print indicia on both opposite surfaces of the pellets P without the need to pass the pellets P between multiple drums, or to reorient the pellets after they are seated in a first drum.

After printing, as the drum 14 continues to rotate, the pellets P clear the support member 68 and arrive at an entry point for the discharge chute 64, as best shown in FIGS. 2, 5 and 6. The pellets P then exit their respective receptacles 22, either by gravity or by a flow of air directed toward the pellets P from a nozzle 80 external to the drum 14, and enter the discharge chute 64, which directs them away from the inner portion 18 of the drum 14, e.g. into another hopper, etc. for packaging, etc.

Preferably, the drum is caused to rotate continuously at a substantially constant rate of rotation, the vacuum and air streams flow continuously, and pellets are fed to the drum continuously, at a rate that is controlled to prevent overflowing of the hopper or overburdening of the drum/drive system.

Accordingly, the printing machine described above allows for two-sided printing of pellets while employing only a single drum for transporting the pellets. The need for multiple drums and synchronization of drums is thus eliminated. Further, the printing machine described above uses the drum itself as a pellet hopper for feeding pellets, feeds pellets to receptacles in the drum from the interior portion of the drum, and is configured to carry pellets, and imprint pellets, while they are carried on an inner surface of the drum.

FIG. 7 is a front side view of an alternative embodiment of the printing machine of FIG. 1. The printing machine of FIG. 7 is similar to that of FIGS. 1-6 in that it includes a rotatable drum 14 having a sidewall 16, etc. However, in this embodiment the drum 14 includes a first portion of an end wall (obscured in FIG. 7 by bracing wall 28) that is fixed to and rotates with the sidewall 16, and a second portion 32*b* of an end wall that is fixed to the support structure 12 and does not rotate with the sidewall 16. A conventional motorized drive system may be used for driving a drum in this manner. By way of example, a toothed ring supported by bearings and driven by a drive gear may be used, such as a HEPCO ring system, such as model #R76-799-R360-P, manufactured and/or sold by Hepco Slide Systems Ltd. of Devon, England, is suitable for this purpose. The second portion 32*b* of the end wall therefore provides a convenient location for supporting printing and other devices. For illustrative purposes, two rotogravure printing devices 42, 44 are shown in FIG. 7. Alternatively, other conventional printing, inspecting or drilling equipment may be similarly positioned and used instead of printing devices 42, 44. The supply chute 60 may also be positioned through the second portion 32*b*, and may be fed by a hopper behind the drum. In this embodiment, the receptacles are configured to allow the pellets to pass through the sidewall. Thus, the exhaust chute 64 is positioned externally to the sidewall, and the air jet nozzle 80 is positioned within the sidewall 16 for blowing pellets outwardly through the sidewall 16 and into the exhaust chute 64.

By way of example of alternative embodiments within the scope of the present invention, the drum may be configured with receptacles configured to receiving pellet-like objects having substantially round cross-sections, such as soft-gels, capsules or caplets, and conventional spin printing device equipment may be used to, for example, print on both opposite sides of the pellet from a single side of the drum by causing the pellet to rotate in the receptacle during the spin printing process.

As described above, a vacuum may be applied at a location generally opposing a printing or other device to uniformly position a pellet relative to the receptacle.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A printing machine for printing indicia on a plurality of pellets, the machine comprising:

a support structure;

a drum carried on said support structure and rotatable about a substantially horizontal axis, said drum having a peripheral sidewall defining an inner portion, said sidewall having an inner surface proximate said axis, said inner surface defining a plurality of receptacles arranged in a plurality of rows extending axially of said drum, each of said plurality of rows comprising more than one of said plurality of receptacles, each of said plurality of receptacles being dimensioned to receive a respective one of said plurality of pellets;

a bracing wall cooperating with said drum to define a pellet hopper configured to receive said plurality of pellets in bulk form and to feed pellets to said plurality of receptacles of said drum, said pellet hopper being defined internal to said drum proximate a lower portion of said drum;

a drive system operable to rotate said drum relative to said support structure; and a printing device fixed relative to said support structure in position to print indicia on each of said plurality of pellets while positioned within respective ones of said plurality of receptacles as said drum rotates relative to said support structure.

2. The printing machine of claim 1, wherein said printing device is positioned to print indicia on a respective first portion of each of said plurality of pellets.

3. The printing machine of claim 2, wherein said printing device is positioned within said inner portion of said peripheral sidewall.

4. The printing machine of claim 1, wherein each of said plurality of receptacles defines an aperture that is open through said peripheral sidewall.

5. The printing machine of claim 4, wherein said printing device is positioned to print indicia on a respective second portion of each of said plurality of pellets, each said respective second portion facing radially outwardly of said drum and being accessible for printing via a respective aperture of each of said plurality of receptacles.

6. The printing machine of claim 5, wherein said printing device is positioned exterior to said peripheral sidewall.

7. The printing machine of claim 4, wherein each said respective first portion faces radially inwardly of said drum, said printing machine further comprising:

a second printing device fixed relative to said support structure in position to print indicia on each of said plurality of pellets while positioned within respective ones of said plurality of receptacles as said drum rotates relative to said support structure;

said second printing device being positioned to print indicia on a respective second portion of each of said plurality of pellets, each said respective second portion facing radially outwardly of said drum and being accessible for printing via a respective aperture of each of said plurality of receptacles.

8. The printing machine of claim 7, wherein said printing device is positioned within said inner portion of said peripheral sidewall, and wherein said second printing device is positioned externally to said inner portion of said peripheral sidewall.

9. The printing machine of claim 1, wherein said axis is substantially horizontal.

10. The printing machine of claim 1, wherein said bracing wall is joined to said peripheral sidewall of said drum, said bracing wall extending radially inwardly of said drum.

11. The printing machine of claim 1, wherein said bracing wall is fixed in position relative to said support structure in adjacent relationship to said peripheral sidewall of said drum.

12. The printing machine of claim 1, further comprising a support member fixed in position relative to said support structure, said support member being positioned within said inner portion of said peripheral sidewall and after said printing device along a path of travel of said plurality of receptacles, said support member being in a position to prevent gravity from causing said pellets to exit respective ones of said plurality of receptacles.

13. The printing machine of claim 12, wherein each of said plurality of receptacles defines an aperture that is open through said peripheral sidewall; said printing device being positioned externally to said inner portion of said peripheral sidewall; each said respective first portion facing radially outwardly of said drum and being accessible for printing via a respective aperture of each of said plurality of receptacles.

14. The printing machine of claim 1, further comprising a first chute fixed relative to said support structure in a position to direct a supply of pellets to said pellet hopper within said inner portion of said peripheral sidewall.

15. The printing machine of claim 1, further comprising a second chute fixed relative to said support structure in position to direct pellets imprinted with indicia away from said inner portion of said peripheral sidewall after said pellets have traveled in said plurality of receptacles through at least 90 degrees rotation of said drum after having been imprinted with said indicia.

16. The printing machine of claim 15, further comprising:

a nozzle supported externally to said internal portion of aid peripheral sidewall in position to direct a flow of air toward said internal portion of said peripheral sidewall to dislodge a pellet from a respective one of the plurality of receptacles and direct it into said second chute.

17. The printing machine of claim 1, wherein said printing device comprises a rotogravure printer.

18. The printing machine of claim 1, wherein said printing device comprises a laser printer.

19. A printing machine for printing indicia on a plurality of pellets, the machine comprising:

a support structure having a bracing wall;

a drum carried on said support structure and rotatable about a substantially horizontal axis, said drum having a peripheral sidewall defining an inner portion, said peripheral sidewall having an inner surface proximate said axis, said inner surface defining a plurality of receptacles, each of said plurality of receptacles being dimensioned to receive a respective one of said plurality of pellets and defining an aperture that is open through said peripheral sidewall, said peripheral sidewall cooperating with said bracing wall to define a pellet hopper;

a drive system operable to rotate said drum relative to said support structure;

a first printing device fixed relative to said support structure in position to print indicia on a respective first portion of each of said plurality of pellets while said pellets are positioned within respective ones of said plurality of receptacles as said drum rotates, each said respective first portion facing radially inwardly of said drum;

a second printing device fixed relative to said support structure in position to print indicia on a respective second portion of each of said plurality of pellets while said pellets are positioned within respective ones of said plurality of receptacles as said drum rotates, each said respective second portion facing radially outwardly of said drum and being accessible for printing via a respective aperture of each of said plurality of receptacles;

a first chute fixed relative to said support structure in a position to direct a supply of pellets to said internal portion of said peripheral sidewall; and a second chute fixed relative to said support structure external to said drum in a position to direct pellets printed with indicia through said peripheral sidewall and away from said internal portion of said peripheral sidewall.

20. A method for printing indicia on a plurality of pellets, the method comprising:

providing a drum rotatable about an axis and having a peripheral sidewall defining an inner portion, said peripheral sidewall having an inner surface proximate said axis, said inner surface defining a plurality of receptacles, each of said plurality of receptacles being dimensioned to receive a respective one of said plurality of pellets;

supplying the plurality of pellets to said inner portion of said drum;

rotating said drum about said axis;

printing indicia on each of said plurality of pellets while said pellets are positioned within respective ones of said plurality of receptacles; and removing each of said plurality of pellets from respective ones of said plurality of receptacles after each of said plurality of pellets has traveled in a respective one of said plurality of receptacles through at least 90 degrees rotation of said drum after having been imprinted with said indicia.

21. A method for acting on a plurality of pellets, the method comprising:

providing a drum rotatable about an axis and having a peripheral sidewall defining an inner portion, said peripheral sidewall having an inner surface proximate said axis, said inner surface defining a plurality of receptacles, each of said plurality of receptacles being dimensioned to receive a respective one of said plurality of pellets;

supplying the plurality of pellets to said inner portion of said drum;

rotating said drum about said axis;

acting on each of said plurality of pellets while said pellets are positioned within respective ones of said plurality of receptacles, said acting comprising one of imprinting, inspecting and drilling; and allowing each of said plurality of pellets from respective ones of said plurality of receptacles to pass through said peripheral sidewall after having been imprinted with said indicia.

22. The printing machine of claim 15, further comprising:

a nozzle supported internally to said internal portion of said peripheral sidewall in position to direct a flow of air toward said external portion of said peripheral sidewall to dislodge a pellet from a respective one of the plurality of receptacles and direct it into said second chute.

* * * * *